(12) United States Patent
Pande et al.

(10) Patent No.: US 7,368,890 B2
(45) Date of Patent: May 6, 2008

(54) POWER CONVERTER WITH ACTIVE DISCHARGING FOR IMPROVED AUTO-RESTART CAPABILITY

(75) Inventors: Manish Pande, Cambridge (CA); Jason Cornelius Wiseman, Guelph (CA)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 11/349,332

(22) Filed: Feb. 7, 2006

(65) Prior Publication Data

US 2007/0182361 A1     Aug. 9, 2007

(51) Int. Cl.
*H02P 3/18*     (2006.01)
(52) U.S. Cl. ............... 318/812; 318/727; 318/729; 318/801; 318/700
(58) Field of Classification Search ............... 318/812, 318/727, 729, 801, 700, 782, 795, 803; 363/61; 307/109
See application file for complete search history.

(56) References Cited

U.S. PATENT DOCUMENTS

| | | | |
|---|---|---|---|
| 5,523,665 A | 6/1996 | Deaver | |
| 5,986,907 A * | 11/1999 | Limpaecher | ............... 363/61 |
| 6,617,814 B1 | 9/2003 | Wu et al. | |
| 6,867,564 B1 | 3/2005 | Wu et al. | |
| 2003/0048006 A1* | 3/2003 | Shelter et al. | ............... 307/64 |
| 2006/0044711 A1 | 3/2006 | Wiserman | |

* cited by examiner

*Primary Examiner*—Karen Masih
(74) *Attorney, Agent, or Firm*—John T. Pienkos; Alexander R. Kuszewski

(57) ABSTRACT

A method of operating a power converter in response to an interruption in an input power being provided to the power converter, as well as a power converter capable of performing such method and including a rectifier and an inverter coupled at least indirectly with one another, are disclosed. In at least some embodiments, the method includes (a) operating the rectifier so that energy stored in at least one first component coupled at least indirectly to at least one input terminal of the rectifier is transferred to an intermediate component coupled between the rectifier and the inverter, while the inverter is operated in a first disconnect mode, and (b) subsequently operating the inverter so that at least some of the energy transferred to the intermediate component is transferred to at least one output port of the power converter, while the rectifier is operated in a second disconnect mode.

36 Claims, 5 Drawing Sheets

POWER CONVERTER WITH ACTIVE DISCHARGING FOR IMPROVED AUTO-RESTART CAPABILITY

CROSS-REFERENCE TO RELATED APPLICATIONS

N/A

STATEMENT REGARDING FEDERALLY SPONSORED RESEARCH OR DEVELOPMENT

N/A

FIELD OF THE INVENTION

The present invention relates to power conversion devices and, more particularly, to power conversion devices for outputting three-phase power such as can be used by three-phase devices such as motors.

BACKGROUND OF THE INVENTION

A variety of power conversion devices capable of providing a variety of types and levels of power for a variety of different purposes are now available on the market. A number of these power conversion devices are designed to output three-phase, alternating current (AC) electrical power for use by three-phase AC machines and other devices. For example, in the field of electric motors and motor drives, a three-phase AC motor can be connected to a motor drive, which includes (and operates as) a power converter and provides three-phase AC electrical power to the motor in a controlled fashion. By controlling the currents (and voltages) applied to a given motor, the motor drive further is capable of controlling motor speed, torque and other motor performance characteristics.

Although power converters can take a variety of forms, many power converters including many of those serving as motor drives are power converters that employ pulse width modulation (PWM) techniques to convert power from one form into another, and to generate the desired three-phase AC output power. Many such PWM power converters include both a rectifier stage and an inverter stage, which are implemented by way of bridges having multiple switching devices such as silicon controlled rectifiers (SCRs), symmetric gate commutated thyristors (SGCTs), integrated gate commutated thyristors (IGCTs), insulated gate bipolar transistors (IGBTs), and a variety of other types of switching devices, depending upon the embodiment. Power converters of this type can include, for example, voltage source inverters (VSIs) and current source inverters (CSIs), among others.

Although many conventional PWM power converters such as the drives mentioned above are highly effective in converting input power into the desired, three-phase AC output power, one aspect of the operation of such PWM power converters that could be improved relates to the manner in which the PWM power converters operate when there are momentary losses of power (e.g., momentary line losses) with respect to the power being input to the power converters. It is well known that, when voltages from a line/utility (or other power source) are reapplied to a drive, transient voltage(s) can be produced due to the resonant nature of the drive's input filter (typically including both capacitors as well as inductors), particularly at the instant at which the voltages are reapplied. Further, if residual voltages remain on the input filter capacitors of the drive when power is reapplied to the drive, the transient voltage(s) experienced by the drive tend to be further exacerbated.

Large transient voltage(s) occurring in a drive can create voltage stress on the capacitors and the semiconductor devices of the drive and potentially result in damage to the drive. Because the presence of residual voltages on the input filter capacitors particularly aggravates the creation of these transient voltages, it is desirable that any input filter capacitors be discharged prior to recommencement of drive operation following an input power lapse. That is, upon the opening of the input terminal(s) of a drive (particularly of its rectifier stage) during power failures, one or more of the input filter capacitors typically are charged, and such charged capacitors should be discharged prior to restarting of the drive/closing of the input terminals. Yet the conventional manner of discharging input filter capacitors in drives, typically by way of the filter capacitors' internal bleeder resistors, is excessively slow (e.g., taking nearly a minute), and is inconsistent with providing a drive that is capable of uninterrupted or substantially uninterrupted operation notwithstanding occasional brief input power lapses.

For at least these reasons, therefore, it would be advantageous if an improved drive or other power converter could be developed that, while employing energy-storage components such as input filter capacitors, also was capable of operating or being operated in a manner that facilitated the rapid discharging of such energy-storage components when the provision of input power to the power converter was disrupted, prior to re-energizing the power converter. It would further be advantageous if such an improved power converter achieving such operation could be realized without the need for many additional structural components.

BRIEF SUMMARY OF THE INVENTION

The present inventors have recognized the desirability of an improved power converter that could achieve more rapid discharge of its input filter capacitors (or, depending upon the embodiment, achieve the more rapid discharge of other energy-storage components in addition to or instead of such filter capacitors). The present inventors have additionally recognized that, in at least some embodiments of power converters, it would be possible to more rapidly discharge the input filter capacitors by operating the switching devices of the power converter in a special manner so as to achieve an "active discharge" of the input filter capacitors. More particularly, in at least some such embodiments, the power converter can be operated so that stored capacitor energy is first transferred from the filter capacitors to a DC link stage within the power converter located between rectifier and inverter stages of the power converter, and subsequently transferred from the DC link stage out to the motor (or other load).

More particularly, the present invention in at least some embodiments relates to a method of operating a power converter in response to an interruption in an input power being provided to the power converter, where the power converter includes a rectifier and an inverter coupled at least indirectly with one another. The method includes (a) operating the rectifier so that energy stored in at least one first component coupled at least indirectly to at least one input terminal of the rectifier is transferred to an intermediate component coupled between the rectifier and the inverter, while the inverter is operated in a first disconnect mode, and (b) subsequently operating the inverter so that at least some of the energy transferred to the intermediate component is transferred to at least one output port of the power converter, while the rectifier is operated in a second disconnect mode.

Additionally, in at least some embodiments, the present invention relates to a power converter that includes a rectifier section, an inverter section, and at least one first energy storage component coupled to at least one first input port of the rectifier section. The power converter further includes at least one second energy storage component coupled to at least one second input port of the inverter section and to at least one first output port of the rectifier section, and means for controlling that is coupled to each of the rectifier section and the inverter section. Upon an occurrence of an input power disruption, the means for controlling causes energy to be transferred from the at least one first energy storage component to the at least one second energy storage component, and then subsequently the means for controlling causes at least some of the energy to be transferred from the at least one second energy storage component to at least one second output port of the inverter section.

Further, in at least some embodiments, the present invention relates to a computer-readable medium embodying instructions for a processor to perform a method of discharging three energy storage devices coupled to three input ports of a power converter. The method includes generating first control signals for controlling a rectifier and an inverter, where the first control signals include first inverter control signals that are configured to cause the inverter to operate in a disconnect mode of operation, and where the first control signals also include first rectifier control signals that are configured to cause substantially all stored energy in all of the three energy storage devices to be transferred to at least one intermediate energy storage component coupled to each of the rectifier and the inverter.

DETAILED DESCRIPTION OF THE PREFERRED EMBODIMENT

Figure 1:
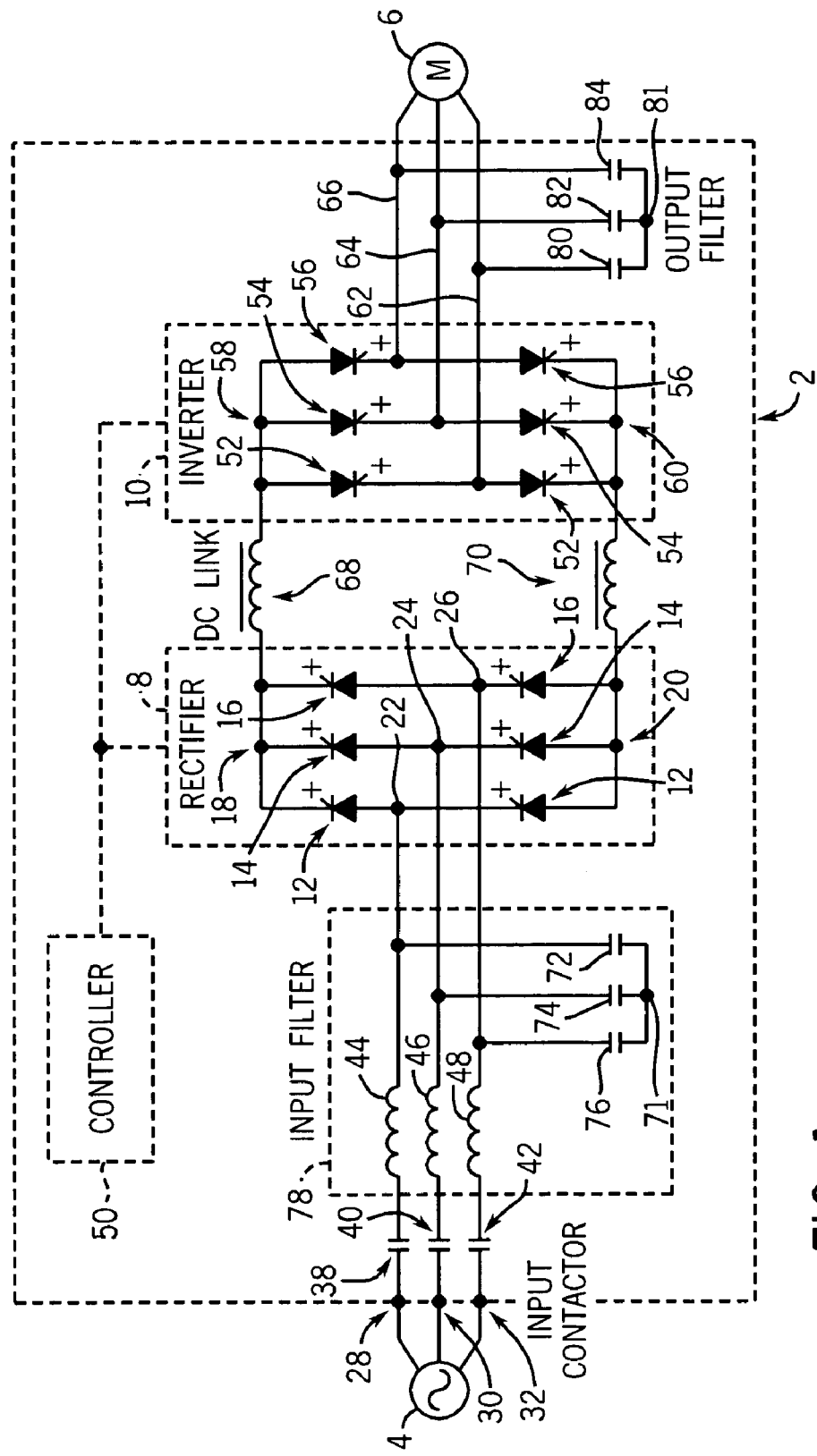
FIG. 1 is a schematic showing an exemplary power converter coupled in between a three-phase voltage source and a three-phase load, where the power converter is capable of being operated to perform an active discharge operation in accordance with at least some embodiments of the present invention.

Referring to FIG. 1, a schematic is provided regarding a first exemplary power converter 2 that is coupled to a three-phase AC power source 4 and a three-phase load 6. In the present embodiment, the power converter 2 is a current source inverter (CSI) that, as described in further detail below, includes a first stage that is a rectifier 8 and a second stage that is an inverter 10. The three-phase AC power source 4 is intended to be representative of a variety of AC power sources that could provide first, second and third phases of AC electrical power to the power converter 2 including, for example, a utility/power line or other voltage source, and potentially can include three separate voltage sources. The AC power source 4 in the present embodiment is an AC voltage source albeit, in other embodiments it could be another type of power source such as an AC current source. Additionally, in the embodiment shown, the load 6 is a three-phase AC motor (e.g., an induction or synchronous motor), and can be modeled as three resistors respectively in series with three inductors (not shown) that represent three different windings of the motor, respectively. However, the load 6 is also intended to be representative of other three-phase AC loads including, for example, other electromechanical machines.

Further as shown in FIG. 1, the rectifier 8 of the power converter 2 includes first, second and third pairs of symmetric gate commutated thyristors (SGCTs) 12, 14 and 16, respectively. The SGCTs of each pair 12, 14 and 16 are coupled in series with one another between first and second nodes 18 and 20, respectively. Additionally, first, second and third additional nodes 22, 24 and 26, which are respectively between the SGCTs of each of the first, second and third pairs, 12, 14 and 16, respectively, are coupled to first, second and third input ports 28, 30 and 32, respectively, of the overall power converter 2. More specifically, the first, second and third input ports 28, 30 and 32 are respectively coupled to first, second and third input contacts 38, 40 and 42, respectively, which together constitute an input contactor (or breaker or other disconnect device). The input contacts 38, 40 and 42 in turn are respectively coupled to first, second and third filter inductors 44, 46 and 48, respectively, which are respectively coupled between the respective input contacts and the respective first, second and third additional nodes 22, 24 and 26, respectively.

During normal operation of the power converter 2, the rectifier 8 operates to convert the three phases of AC power received at the first, second and third input ports 28, 30 and 32 and subsequently at the first, second and third additional nodes 22, 24 and 26 into DC power with DC current output at the nodes 18, 20 (e.g., with currents of equal and opposite polarities flowing to/from the nodes 18, 20). The rectifier 8 achieves the AC to DC conversion by way of appropriate switching on and off (or pulsing on and off) of the pairs of SGCTs 12, 14 and 16 as determined by a controller 50, which can be a microprocessor, programmable logic device (PLD) or other control device.

As for the inverter 10 it also is a PWM device that employs first, second and third pairs of SGCTs 52, 54 and 56, respectively, where the SGCTs of each pair 52, 54 and 56 are coupled in series with one another between first and second nodes 58 and 60. The pulsing on and off of the SGCTs of the inverter 10 also is governed by the controller 50. Further, fourth, fifth and sixth additional nodes 62, 64 and 66, respectively, are positioned respectively between the SGCTs of each pair 52, 54 and 56, and respectively constitute (or in alternate embodiments are respectively coupled to) first, second and third output ports of the power converter 2 at which are provided three phases of outputs to the load 6.

Additionally as shown, the first and second nodes 18 and 20, respectively, of the rectifier 8 are coupled to the first and second nodes 58 and 60, respectively, of the inverter 10 by way of first and second inductors 68 and 70, respectively, which are magnetically coupled to one another so as to be mutually inductive. The inductors 68, 70 serve as chokes allowing DC current to pass between the rectifier 8 and the inverter 10, while at the same time filtering out (at least some) AC power, and thus the inductors can be considered to form a "DC link" of the power converter 2. By virtue of the pulsing on and off of the pairs of SGCTs 52, 54 and 56, the DC power provided by way of the DC link is converted into the AC output power provided at the fourth, fifth and sixth additional nodes 62, 64 and 66 and output by the power converter 2.

Further as shown, the power converter 2 also has six capacitors. First, second and third capacitors 72, 74 and 76, respectively, couple the respective first, second and third additional nodes 22, 24 and 26 of the rectifier 8 to a common node 71. Together with the inductors 44, 46 and 48, the capacitors 72, 74 and 76 form an input filter 78 that filters extraneous power (e.g., power lacking the desired AC characteristics) provided from the input contacts 38, 40 and 42 before it reaches the rectifier 8. In addition to the capacitors 72, 74 and 76, the power converter 2 also has fourth, fifth and sixth capacitors 80, 82 and 84, respectively, which couple the respective fourth, fifth and sixth additional nodes 62, 64 and 66 of the inverter 10 to a common node 81 and serve as an output filter.

Figure 2:
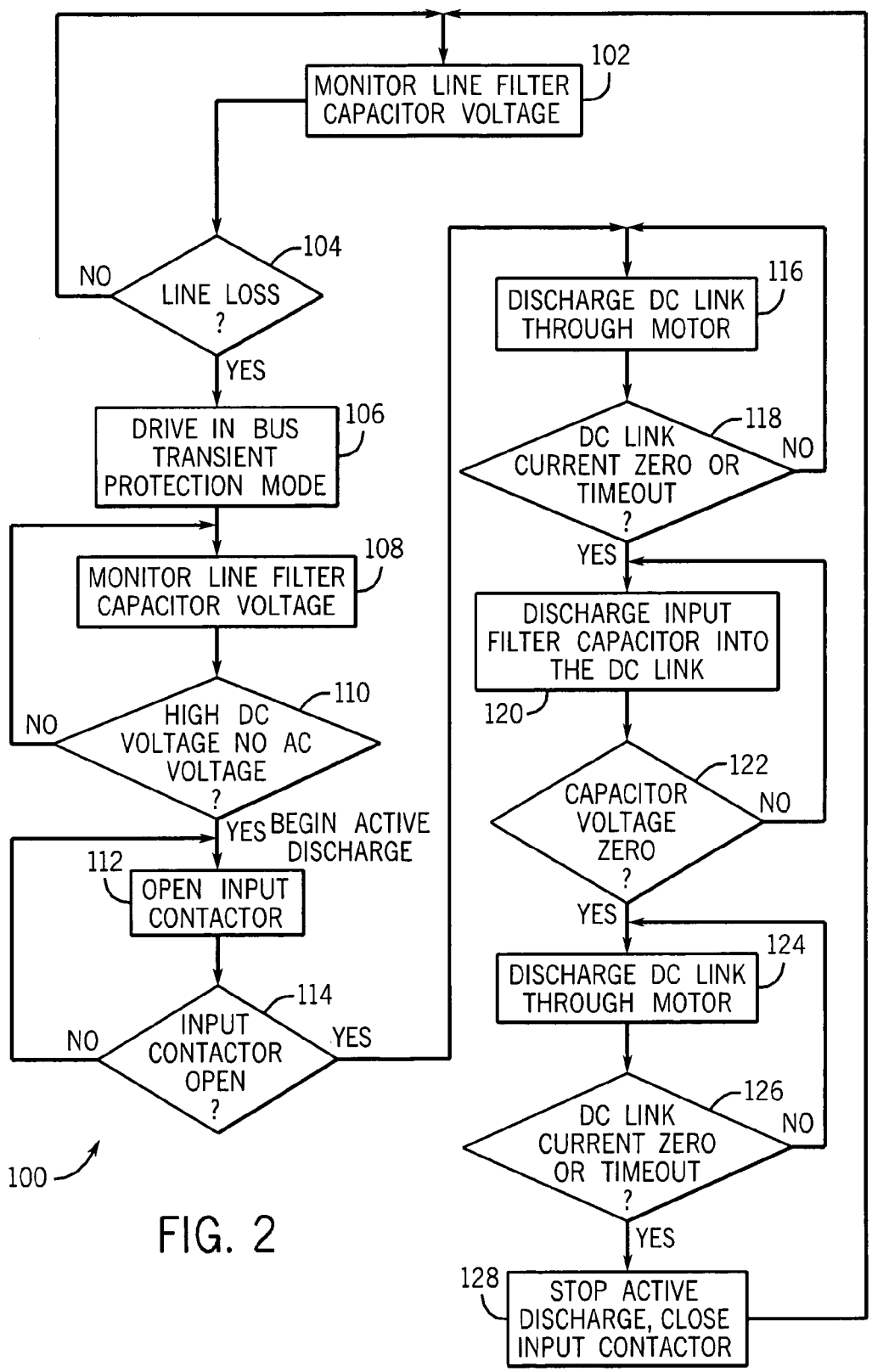
FIG. 2 is a flow chart showing exemplary steps of operation of the power converter of FIG. 1 that are performed to achieve active discharge of stored capacitor energy in accordance with at least some embodiments of the present invention.

As discussed above, in at least some circumstances, the AC power source 4 can experience failures or other events that result in the disruption of power being supplied to the power converter 2. When such disruption occurs, typically one or more of the filter capacitors 72, 74 and 76 are at such times partly charged and are storing some energy. For at least the reasons discussed above, it is desirable for these filter capacitors to be discharged and, in particular, to be discharged quickly. FIG. 2 provides a flow chart 100 showing exemplary operational steps of the power converter 2 as governed by the controller 50 that allow the power converter 2 to perform "active discharging" of the filter capacitors 72, 74 and 76 in such a manner that the filter capacitors are discharged much more rapidly than would otherwise be the case in connection with the operation of conventional power converters.

As shown in FIG. 2, the active discharging technique in at least some embodiments is a multi-step energy transfer process. During normal operation of the power converter 2, the controller 50 (by way of voltage/current sensors, not shown) monitors the voltages across the filter capacitors 72, 74 and 76 to detect whether a line loss (or other disruption in the power being supplied by the AC power source 4) has occurred, as represented by a step 102. Upon detecting that a line loss has occurred, at a step 104, the power converter 2/controller 50 enters a "transient protection mode" at a step 106. Upon entering the transient protection mode, the controller 50 continues to monitor the voltages across the filter capacitors 72, 74 and 76 to detect whether the voltages across the filter capacitors have reached a DC state, as represented by a step 108. If at a step 110 it is determined that none of the filter capacitors 72, 74 or 76 any longer has any AC voltage, and that one or more of the filter capacitors has a DC voltage, the controller 50 then initiates the active discharging process by proceeding to a step 112 (otherwise, the controller cycles between steps 108 and 110). In particular, upon the commencement of the active discharging process at step 112, the controller 50 of the power converter 2 commands the input contacts 38, 40 and 42 (which are closed during normal operation of the power converter) to open, and then awaits confirmation of this status at a step 114. To the extent that confirmation is not obtained, the power converter 2 repeats steps 112 and 114.

Once the confirmation is obtained, the controller 50 then proceeds to a step 116, at which the controller directs the operation of the rectifier 8 and inverter 10 so as to cause pre-discharging of any trapped energy within the DC link (e.g., the inductors 68, 70) of the power converter 2 into the load 6. Such pre-discharging is desirable (and, at least in some embodiments, is necessary) in order to make room in the DC link, in terms of the energy storage capacity of the inductors 68, 70, for the energy stored in the capacitors 72, 74 and 76. In particular, it is desirable to pre-discharge the inductors 68, 70 of the DC link in case there is any DC current trapped from free-wheeling. This is accomplished by causing the pairs of SGCTs 12, 14 and 16 of the rectifier 8 to enter a disconnect mode such that the DC link is effectively disconnected from the input contacts 38, 40 and 42 (and the capacitors 72, 74 and 76) so that energy transfer therebetween is entirely or substantially precluded, and producing maximum positive DC voltages within the inverter 10. In the present embodiment, the disconnect mode is a free-wheeling mode (e.g., achieved by short-circuiting the pairs of SGCTs 12, 14 and 16), albeit effective decoupling of the DC link from the input contacts can be achieved in other manners, for example, when other types of power converters are employed as discussed in further detail below.

While the rectifier 8 is operated in the disconnect mode, the controller 50 additionally controls the SGCTs 52, 54 and 56 of the inverter 10 to fire in a normal PWM pattern. Assuming that the load 6 is a motor, and further assuming that the motor flux is known, the inverter 10 fires at a firing angle to produce maximum torque. This results in the maximum inverter DC link voltage, such that the inductors 68, 70 are discharged at the maximum possible rate. However, if the motor flux is not known, the inverter 10 injects DC current into the motor as is normally done in the magnetizing interval during a start. Since the motor voltage and DC link voltage are low, this results in a relatively slow discharge (e.g., 100 ms), mainly through device, DC link and motor losses.

In any event, as indicated by a step 118, the controller 50 monitors whether the DC link current is zero or sufficiently close to zero (e.g., by way of current monitors, not shown) and whether a given (arbitrary) time period has elapsed (e.g., 1 second) since the pre-discharging at step 116 began. Until at least one of these conditions is met, the power converter 2 continues to cycle between steps 116 and 118, such that the pre-discharging continues. The time-out condition is designed to allow the controller 50 to leave step 116 in the event there is some type of malfunction such that the DC link current apparently is not progressing to zero.

Once one or both of the conditions of step 118 are met, the power converter 2 advances to a step 120, in which the rectifier 8 and inverter 10 are operated in a manner resulting in most (or all) of the energy stored in the filter capacitors 72, 74 and 76 (e.g., associated with DC voltages existing across one or more of those capacitors) being transferred into the inductors 68, 70 of the DC link. More specifically, after the inductors 68, 70 of the DC link have been pre-discharged, the controller 50 causes the inverter 10 to enter a disconnect mode such that the DC link is effectively decoupled from the nodes 62, 64 and 66 (e.g., from the output terminals of the power converter 2). In the present embodiment, the disconnect mode of the inverter 10 is a free-wheeling mode (e.g., in which one of the SGCT pairs 52, 54 and 56 are short-circuited), albeit in other embodiments the DC link could be effectively decoupled from the output nodes/ports in other manners.

While the inverter 10 is operating in the disconnect mode, the controller 50 further causes the rectifier 8 to operate in a particular manner such that the DC link becomes available as a sink for the energy in the capacitors 72, 74 and 76. As discussed in further detail below, the particular manner in which the rectifier 8 operates can be significant in determining whether all of the voltages across each of the filter capacitors 72, 74 and 76 are largely or substantially discharged instead of only one of those voltages being discharged.

Figure 3:
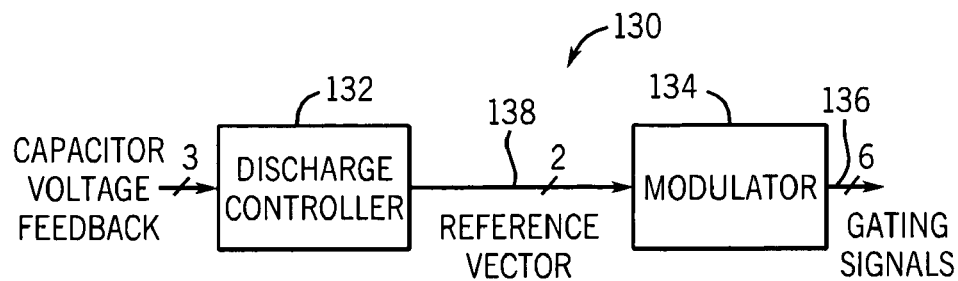
FIG. 3 is a block diagram showing in simplified form several processing steps performed by a control device of the power converter of FIG. 1 in order to achieve active discharge of stored capacitor energy in accordance with at least some embodiments of the present invention.
Figure 4:
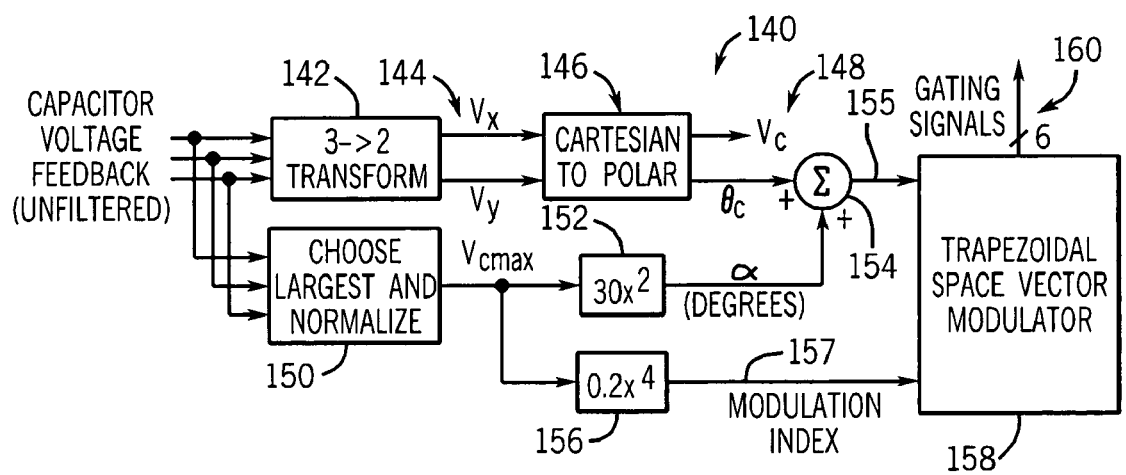
FIG. 4 is a block diagram showing in more detail than FIG. 3 several processing steps performed by a control device of the power converter of FIG. 1 in order to achieve active discharge of stored capacitor energy in accordance with at least some embodiments of the present invention.

Referring additionally to FIGS. 3 and 4, in the present embodiment, the controller 50 regulates the speed at which the filter capacitors 72, 74 and 76 discharge their energy into the inductors 68, 70 of the DC link by adjusting the DC output voltage of the rectifier 8 through the modulator reference vector. Exemplary processing steps of the controller 50 in achieving control of the rectifier 8 (more specifically, the pulsing on and off of the SGCTs 12, 14 and 16 of the rectifier) are shown in simplified form in a block diagram 130 of FIG. 3 and in further detail in a block diagram 140 of FIG. 4.

As shown in FIG. 3, based upon the information received concerning the voltages on the filter capacitors 72, 74 and 76, the controller 50 first performs a discharge control step 132 in which a rate of discharging is adjusted to suit the capability of the digital control system and the switching frequency of the SGCTs 12, 14 and 16 (or other power electronic devices) of the rectifier 8. Fast discharging typically requires a fast switching frequency and a high sampling rate. Additionally, the controller 50 in performing the discharge control step operates as a vector-oriented system that aligns itself with the vector formed by the three-phase capacitor voltage resulting from the three voltages of the capacitors 72, 74 and 76. This type of scheme is necessary because the filter capacitors 72, 74 and 76 are often wye-connected, and the neutral point is not available. Attempting to bring the individual line-to-line voltages to zero separately does not always ensure that the line-to-neutral voltage of each of the capacitors is zero. However, a full discharge can be accomplished by discharging the capacitors as a three-phase set as is done with this scheme.

The result of the discharge control step 132 is a two-component reference vector 138. After the discharge control step 132 is performed, the controller 50 additionally performs a modulation step 134 to generate gating signals 136. As described in more detail below with respect to FIG. 4, in at least one embodiment, this modulation step 134 can involve application of a variable modulation index (using bypass) trapezoidal PWM pattern with delay angle control. However, in alternate embodiments, a wide variety of other types of modulation steps or procedures can be employed including, for example, other (non-trapezoidal) types of space vector modulation, on-line modulation techniques and carrier-based modulation techniques, among others.

In the present embodiment, more particularly, the gating signals 136 are varied as a function of the three-phase capacitor voltage vector magnitude given by equation (1):

$$|V_C, \max| = \text{Max}(V_{ab}, V_{bc}, V_{ca}) \quad (1)$$

$$\theta_c = \tan^{-1}\left(\frac{V_y}{V_x}\right).$$

The gating reference frame is determined from (1) without using a Phase Locked Loop (PLL). Unfiltered voltage feedback inputs are used to avoid delays in the feedback loop. The outputs provided by this step are the six gating signals 136 that are respectively applied to the respective SGCTs of the rectifier 8. In the present embodiment, the switching frequency of the PWM pattern is 500 Hz, albeit other frequencies can also be used.

FIG. 4 shows in more detail exemplary process steps that, in at least some embodiments, can be performed by the controller 50 in controlling the rectifier 8 so that energy from the filter capacitors 72, 74 and 76 is transferred to the inductors 68, 70 of the DC link. As shown, the controller 50 receives information concerning the voltages on the three filter capacitors 72, 74 and 76 (which is unfiltered feedback information) and, at a step 142, performs a three-to-two transformation to arrive at a two-component voltage 144 having components $V_x$ and $V_y$. At a step 146, the controller 50 then further converts the two-component voltage 144 from its Cartesian form into a polar voltage 148 having a magnitude $V_c$ and an associated angle $\theta_c$. Further as shown, the controller 50 at a step 150 also makes a determination as to which of the voltages on the three capacitors 72, 74 and 76 is the largest. Additionally, while not necessary in alternate embodiments, in the present embodiment the controller 50 then normalizes the voltages in relation to the rated voltage, so as to determine a maximum normalized voltage magnitude $V_{cmax}$, and to allow for subsequent calculations to be performed using per unit values.

This maximum voltage magnitude $V_{cmax}$ in turn is used to determine two quantities, a firing angle α and a modulation index 157. More particularly, at a step 152, the controller 50 in the present embodiment generates the firing angle α as a function of 30 multiplied by the square of the maximum voltage magnitude $V_{cmax}$. The firing angle α in turn is added to the capacitor voltage angle 148 in a summing operation 154 to arrive at a reference angle 155. Additionally, at a step 156, the controller 50 calculates the modulation index 157 as a function of 0.2 multiplied by the maximum voltage magnitude $V_{cmax}$ taken to the fourth power. The modified polar voltage 155 and the calculated modulation index 157 together can be viewed as constituting one embodiment of the reference vectors 138 of FIG. 3. Both the reference angle 155 output from the summing operation 154 and the calculated modulation index 157 are utilized by the controller 50 to perform a trapezoidal space vector modulation step 158, which in turn results in the generation of six gating signals 160 that are respectively provided to the respective SGCTs of the rectifier 8.

Initially, the maximum voltage magnitude $V_{cmax}$ could be more than 100% due to the behavior of the line reactors (e.g., the inductors 44, 46 and 48) during the opening of the input contacts 38, 40 and 42. For this reason, in the present embodiment the delay/firing angle α starts at 75°. This large firing angle reduces the device voltage stress, and is also effective in 'throttling' the rate of energy flow to the inductors 68, 70 of the DC link. The rate of energy flow into the DC link is a function of the DC output voltage of the rectifier 8, which in turn is a product of the capacitor voltage magnitude, modulation index 157, and cosine of the firing angle α. A relatively slow and controlled process is desirable since it allows the transfer to take place at a rate that is compatible with the speed of the sampled-data system, and it allows for a low switching frequency. As discussed above, the delay/firing angle α is proportional to the square of the maximum voltage magnitude $V_{cmax}$, such that the angle is very small when the voltage is small.

Also in the embodiment of FIG. 4, the modulation index 157 is adjusted to reduce the slope of the capacitor voltage as the discharging nears completion. A small slope is desirable in order to prevent "overshooting," where the capacitor voltage goes through zero, and starts charging to the opposite polarity. Thus, the modulation index 157 is adjusted to be proportional to the capacitor voltage raised to the fourth power. A very non-linear function is appropriate because the DC current is near its maximum when the capacitor voltage nears zero, making the potential discharge rate very fast. When the capacitor voltage is near enough to zero, the rectifier 8 immediately freewheels to trap the energy in the inductors 68, 70 of the DC link and stop the capacitor voltage discharge process. If (e.g., in alternate embodiments) the process were not stopped, some of the energy in the DC link would return back to the capacitors. Due to the choice of reference frame and control scheme used, this energy would then need to be removed. In practice, if the speed of discharging is fast, and the capacitor voltage overshoots, the process goes through a series of oscillations.

As mentioned above, the particular type of modulation that is performed can vary depending upon the embodiment. Further, while the reference angle 155 and modulation index 157 are, in the present embodiment, calculated by way of particular formulas (e.g., those associated with steps 152 and 156), these manners of calculating angle 155 and index 157 (and, indeed, any reference vector(s) provided for modulation) can be varied in alternate embodiments. For example, the firing angle α in some alternate embodiments could be zero and/or the manner of calculating the modulation index 157 could employ other exponential functions. In the present embodiment, and in most embodiments, a goal of the particular algorithms that are used is to limit the voltages that occur across the switching devices/bridge notwithstanding the possible existence of relatively high voltages appearing across the input filter capacitors.

Referring again to FIG. 2, as the energy stored in the filter capacitors 72, 74 and 76 is being discharged into the inductors 68, 70 of the DC link at step 120, the controller 50 repeatedly or continually monitors whether the voltages on the filter capacitors have reached (or come close enough to, e.g., within a threshold of) zero, at a step 122. The determination of whether the voltages of the filter capacitors 72, 74 and 76 have reached zero, which is indicative of whether the energy stored in the capacitors has been sufficiently transferred to the DC link, again is typically based upon an evaluation of the overall three-phase voltage of the three filter capacitors. Until such time as the filter capacitor voltages have reached zero, the controller 50 cycles between steps 120 and 122. Once the voltages on the filter capacitors have reached zero, the controller 50 proceeds from step 122 to a step 124, at which the controller 50 then operates the rectifier 8 and inverter 10 in such a manner that the energy trapped in the DC link (obtained from discharging the input filter capacitors) is discharged into the load 6 (e.g., the motor).

More particularly, while during the execution of step 120 the pairs of SGCTs 52, 54 and 56 of the inverter 10 are operated in a disconnect (e.g., free-wheeling) mode and the pairs of SGCTs 12, 14 and 16 of the rectifier 8 are controlled in accordance with a process such as those described with respect to FIGS. 3 and 4, during the execution of the step 124 the pairs of SGCTs 12, 14 and 16 of the rectifier 8 are operated in a disconnect (e.g., free-wheeling) mode and the pairs of SGCTs 52, 54 and 56 of the inverter 10 are operated in the same manner as described above with reference to step 116 such that the energy within the inductors 68, 70 of the DC link is discharged into the load 6 (e.g., motor). Additionally, as indicated by a step 126, the controller 50 monitors whether the DC link current is zero or sufficiently close to zero (e.g., below 2% of its initial value) and whether a given time period has elapsed (e.g., 1 second) since the discharging of step 124 began. Until at least one of these conditions is met, the controller 50 continues to cycle between steps 124 and 126. Once one (or both) of these conditions is met, however, the controller 50 stops the active discharging process at a step 128 and, in particular, stops the gating of the SGCTs of the inverter 10, and then closes the input contacts 38, 40 and 42 (at least when power from the source 4 is restored).

The above-described active discharging process involves transferring the energy in the filter capacitors 72, 74 and 76 to the inductors 68, 70 of the intermediate DC link and then subsequently dissipating that energy in the motor or other load. For this process to achieve the desired transfer of energy, it is necessary that the inductors 68, 70 be (at least temporarily) capable of storing the energy received from the capacitors, and consequently it is necessary that the inductors be capable of handling the DC currents associated with the storage of that energy. The maximum DC currents that the inductors 68, 70 need to be able to handle in a given case when line loss occurs can be calculated as follows. To begin with, the total energy stored in each capacitor is $$E = \frac{1}{2} C \cdot V^2 \qquad (2)$$

where C is the line-to-neutral capacitance and V is the DC line-to-neutral voltage. The total stored energy in the three filter capacitors 72, 74 and 76 and transferred to the DC link is given by:

$$E_{total} = \frac{1}{2} C(V_a^2 + V_b^2 + V_c^2) = \frac{1}{2} L_{dc} I_{dc}^2 \qquad (3)$$

where Va, Vb and Vc represent the voltages of the filter capacitors 72, 74 and 76, respectively, after the input contacts 38, 40 and 42 have been opened. Assuming that all of the energy from the line filter capacitors is transferred to the inductors 68, 70 of the DC link, the resulting DC current would be:

$$I_{dc} = \sqrt{\frac{C(V_a^2 + V_b^2 + V_c^2)}{L_{dc}}} \qquad (4)$$

It can further be shown that the maximum energy is stored when the utility/source 4 is disconnected at the peak of one of the phase voltages. When this occurs, one of the filter capacitors 72, 74 or 76 would have a DC voltage of +1 per unit (if the base voltage is defined to be the peak line-toneutral voltage) and the other two phases would have a DC voltage of −0.5 per unit. Therefore the maximum DC link current in per unit values can be determined by the per unit line filter capacitance and per unit DC link inductance to be:

$$I_{dc} = \sqrt{\frac{\frac{3}{2}C}{L_{dc}}} \quad (5)$$

For a PWM rectifier, typical sizes of the filter capacitors and DC link inductors are 0.4 per unit and 0.6 per unit respectively. This combination would result in a peak DC current of 1 per unit, which would be acceptable. Additionally, power converters with input filter capacitors larger than 0.5 per unit and smaller DC link inductors of 0.5 per unit would result in a DC link current of 1.22 per unit. Although this is large, it can still be acceptable because, in a running power converter/drive, the peak DC current can momentarily exceed this value due to ripple, and high transient output torque.

While preferably the DC link (e.g., the energy storage capacity of the inductors of the DC link) is large enough to allow for all residual input filter capacitor energy to be transferred to the DC link in one step, in alternate embodiments the DC link is not large enough for all such energy to be transferred at once, and consequently the energy must be transferred in multiple steps. In such alternate embodiments, the steps of the flow chart 100 would be modified somewhat such that the sequence of steps involving the transferal of energy from the capacitors to the DC link and subsequently to the motor/load would be repeated on two or more occasions. The flow chart would also include one or more steps relating to the detection of whether a particular finite amount of capacitor voltage/energy had been dissipated rather than simply (as in the case of step 122) relating to detecting whether the capacitor voltages had been reduced to zero.

Although FIGS. 1-4 show exemplary embodiments of power converters and/or the active discharging procedures performed by those power converters, the present invention is also intended to encompass other embodiments of power converters and active discharging operations. To begin with, while the above description concerns drives, the present invention is also applicable with respect to power converters other than drives (e.g., the present invention could pertain in some embodiments to a power converter that is used as a variable voltage, variable frequency power supply for a passive load). Also, while the above description concerns three-phase power converters, the present invention is also applicable with respect to power converters that only are single-phase, or have a multiplicity of phases other than three (e.g., two-phase or four-phase power converters). More particularly, the present invention is applicable to any power converter that has a DC link coupling two stages of power conversion device such as a rectifier and an inverter.

Additionally for example, while the power converter 2 is a CSI power converter, the present invention is also intended to encompass voltage source inverter (VSI) power converters that employ capacitors rather than inductors in the DC link sections of the power converters. Also, while the CSI power converter discussed above is operated in free-wheeling modes as its disconnect modes, in alternate embodiments procedures other than free-wheeling can be employed to decouple/disconnect the DC link from the input and output terminals of a power converter at appropriate times (e.g., can be employed as other disconnect modes of operation). This will often be the case when power converters other than CSI power converters are involved. For example, a disconnect mode involving open-circuiting of switching devices rather than short-circuiting of switching devices (e.g., as in free-wheeling) would typically be employed in conjunction with VSI power converters.

Additionally, in alternate embodiments, the power converters can employ switching devices other than SGCTs, for example, integrated gate commutate thyristors (IGCTs) or insulated gate bipolar transistors (IGBTs). Further, while in the above-described embodiment, each of the rectifier and the inverter includes six switching devices, in other embodiments other types of rectifiers and/or inverters having different numbers or interconnections/orientations of devices can also be employed (e.g., a rectifier having eighteen switching devices rather than six switching devices could be employed). Also, while the above-described embodiments relate to achieving discharging of energy stored on the input filter capacitors of a power converter, the present invention is also intended to encompass other embodiments in which energy stored on other devices (e.g., inductors) is actively discharged.

Further, in three-phase embodiments such as that described above, each of the AC power source and the load can be either wye-connected (Y-connected) devices or delta-connected (Δ-connected) devices. Additionally, while in the embodiment described above both the input filter capacitors and the output filter capacitors are Y-connected, in alternate embodiments one or both sets of filter capacitors can be Δ-connected. Further, the present invention is also intended to encompass other operations/calculations performed by one or more controllers of (or in association with) a power converter in order to achieve the active discharging of stored energy that is retained after a disruption of input power to the power converter. It will be understood that, typically, the controller 50 (or other controller of the power converter) will include or be in communication with one or more memory devices that store program(s) for governing the processing and control operations of the controller, such as those described with respect to FIGS. 2-4.

Turning now to FIGS. 5-8, several graphs (FIGS. 5-7) are provided showing how different signals associated with one exemplary implementation of the power converter 2 could vary with time during a disruption in the input power being provided to the power converter, and additional graphs (FIG. 8) show by comparison how some of the signals would otherwise vary in the absence of such an active discharging procedure. These graphs are generally intended to demonstrate how, in at least some embodiments of the invention, active discharging of residual voltage/stored energy on input filter capacitors of a power converter (or possibly other energy storage devices) is achieved in a rapid manner such that transient voltages are minimized upon reapplication of input power to the power converter (e.g., upon recovery of line voltage), and such that delays in the operation of the power converter related to the discharge of the residual voltage/stored energy are minimal.

Figure 5:
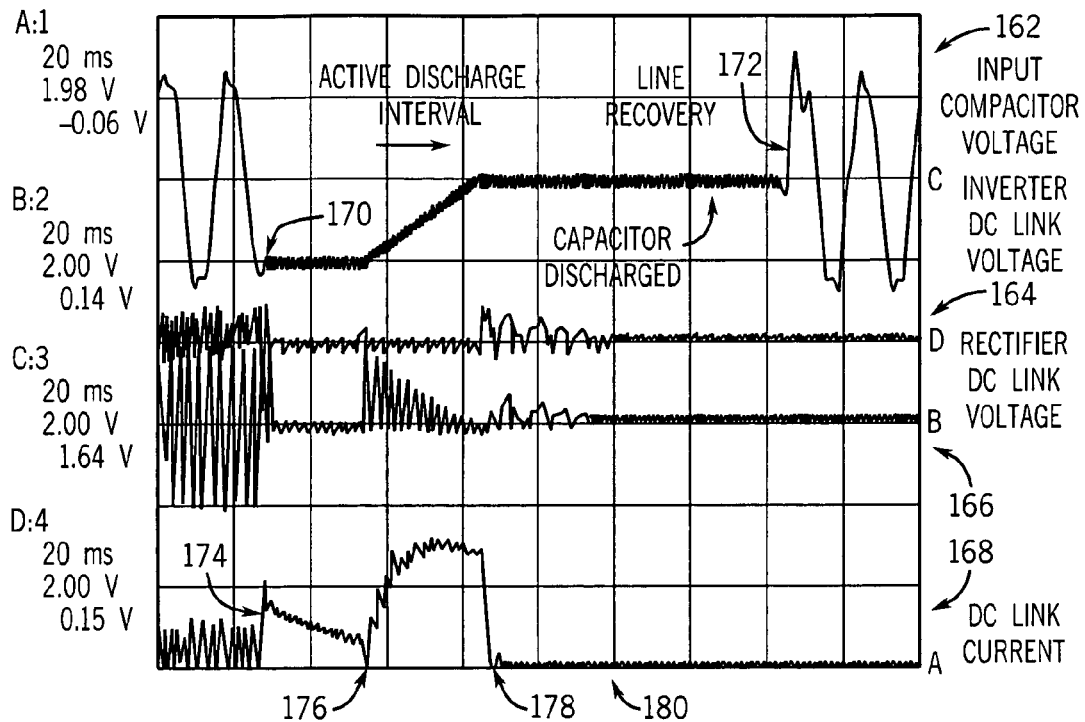
FIGS. 5, 6 and 7 are sets of graphs illustrating exemplary time variation of various signals/characteristics of the power converter of FIG. 1 when configured to perform active discharging in accordance with at least some embodiments of the present invention.

Referring to FIG. 5 in particular, first, second, third and fourth graphs 162, 164, 166 and 168, respectively, show exemplary time variation of the voltage across one of the filter capacitors (e.g., any of the capacitors 72, 74 and 76 of FIG. 1), the inverter DC link voltage (e.g., the voltage existing across the nodes 58 and 60 of FIG. 1), the rectifier DC link voltage (e.g., the voltage existing across the nodes 18 and 20 of FIG. 1), and the current through the DC link (e.g., through one of the inductors 68, 70), respectively. FIG. 5 in particular shows exemplary time variation of these quantities between a first time 170 at which a line loss/input power supply disruption occurs and a second time 172 at which the input power supply recovers.

Further as shown in FIG. 5, after the line loss occurs at the first time 170, at a subsequent time 174 the DC link current shown by the graph 168 begins to decline due to pre-discharging. Next, between a time 176 and a time 178, the controller causes the discharging of the energy stored in the filter capacitors into the DC link, which corresponds to step 120 of FIG. 2. During this time period, the capacitor voltage (graph 162) approaches zero, the DC link current (graph 168) increases and the rectifier DC link voltage (graph 166) experiences pulsing as the SGCTs of the rectifier 8 are pulsed on and off. Subsequent to the time 178, between that time and a time 180, the energy in the DC link is further discharged to the load/motor via the inverter, as corresponds to step 124 of FIG. 2. Correspondingly, graph 164 shows variation in the inverter DC link voltage during this time period. After time period 180, the active discharging process is complete and the input contacts can be closed upon (or in anticipation of) the recovery of the input power at time 172.

Figure 6:
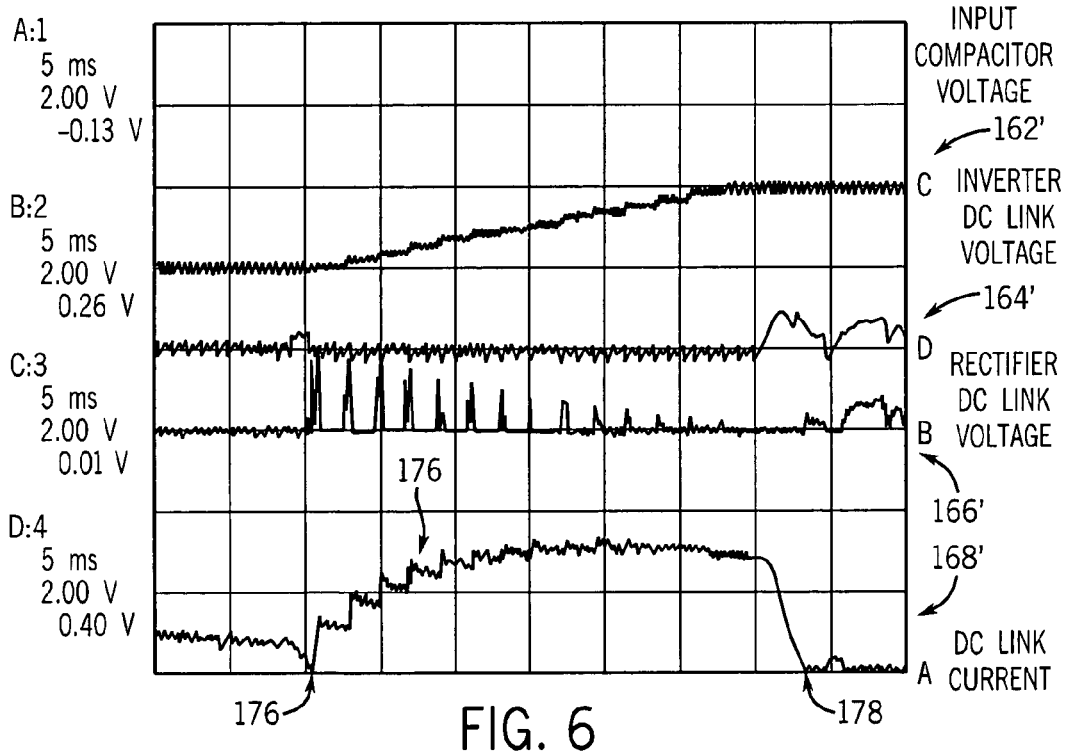
Figure 7:
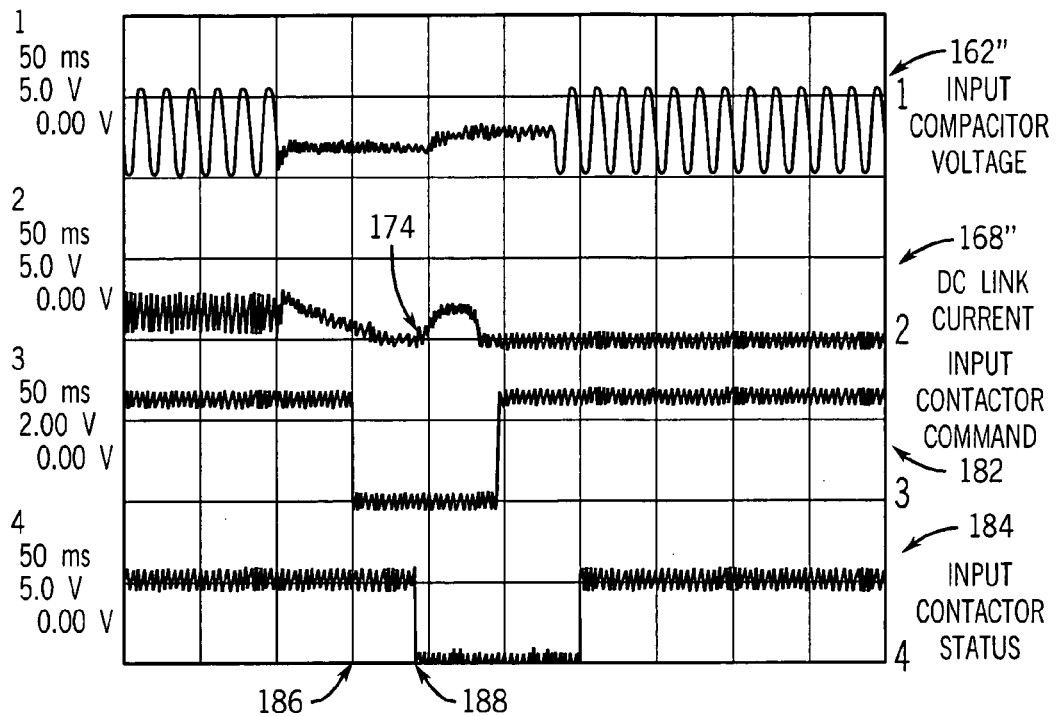
Figure 8:
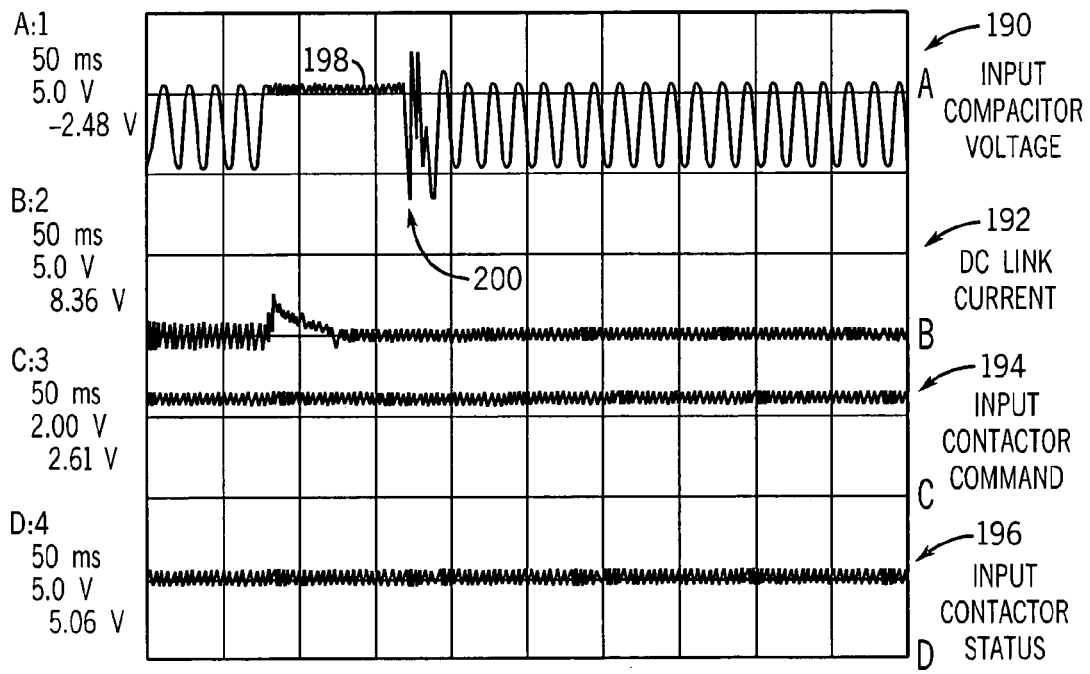
FIG. 8 is an additional set of graphs illustrating how the same signals/characteristics shown in FIG. 7 would behave if the power converter was configured to not perform active discharging.

Turning to the remaining FIGS. 6-8, FIG. 6 shows in greater detail (e.g., magnifies) respective portions of each of the graphs 162, 164, 166 and 168 (now labeled graphs 162', 164', 166' and 168', respectively) that are associated with a time interval extending from just prior to the time 176 to just subsequent to the time 178. FIG. 7 in contrast shows modified versions of the graphs 162 and 168 (now labeled graphs 162" and 168", respectively) that encompass longer periods of time prior to the time 170 and subsequent to the time 172 of FIG. 5. Further, FIG. 7 provides two additional graphs 182 and 184 that respectively show the signal provided by the controller (e.g., the controller 50) to the input contactor (e.g., the contactors 38, 40 and 42) and the status of the input contactor. The graphs 182 and 184 in particular demonstrate that there is a time lapse between a time 186 at which the controller commands the input contacts to open and a time 188 at which the contacts actually open, which occurs at or just prior to the time 174 at which pre-discharging of the DC link begins.

Finally, FIG. 8 provides graphs 190, 192, 194 and 196 that respectively correspond to graphs 162", 168", 182 and 184 of FIG. 7, respectively, in terms of showing the time variation of filter capacitor voltage, DC link current, input contactor command timing, and input contactor operation. However, FIG. 8 illustrates exemplary operation of the power converter 2 in the event that the active discharging procedure described above was not performed subsequent to the occurrence of a power supply disruption. As shown, in such case the DC link current (graph 192) would decrease over time after the power supply disruption, but any nonzero filter capacitor voltage 198 would largely if not entirely remain constant over time. As a result, upon the recovery of the power supply at a time 200, there would typically be considerable, undesirable transient voltage variation.

It is specifically intended that the present invention not be limited to the embodiments and illustrations contained herein, but include modified forms of those embodiments including portions of the embodiments and combinations of elements of different embodiments as come within the scope of the following claims.

We claim:

1. A method of operating a power converter in response to an interruption in an input power being provided to the power converter, wherein the power converter includes a rectifier and an inverter coupled at least indirectly with one another, the method comprising:

(a) operating the rectifier so that energy stored in at least one first component coupled at least indirectly to at least one input terminal of the rectifier is transferred to an intermediate component coupled between the rectifier and the inverter, while the inverter is operated in a first disconnect mode; and (b) subsequently operating the inverter so that at least some of the energy transferred to the intermediate component is transferred to at least one output port of the power converter, while the rectifier is operated in a second disconnect mode.

2. The method of claim 1, further comprising prior to (a):

(c) detecting that the interruption has occurred.

3. The method of claim 1, further comprising prior to (a):

(c) operating the inverter so that at least some of an initial energy within the intermediate component is transferred to an output port of the power converter, while the rectifier is operated in the second disconnect mode.

4. The method of claim 3, further comprising:

(d) at least one of: determining that at least one of a voltage across and a current through the intermediate component has reached a zero level; determining that at least one of the voltage and the current has reached a threshold level; and determining that a time period has elapsed since performing of (c) began.

5. The method of claim 1, further comprising prior to (a):

(c) causing at least one input contact to disconnect a source of the input power from the first component.

6. The method of claim 5, prior to (c):

(d) detecting that at least one of a DC voltage exists across the first component and an AC voltage no longer is appearing across the first component.

7. The method of claim 1, further comprising, prior to (a):

(c) commanding at least one input contactor to open so as to disconnect a source of the input power from the first component upon performing the detecting of (d); and (d) proceeding to (a) upon determining that the input contactor has opened.

8. The method of claim 1, further comprising:

(c) determining that at least one of a voltage across the first component and a current through the first component has at least one of reached zero and reached a threshold level, and proceeding to (b) only after the determining.

9. The method of claim 1, further comprising:

(c) at least one of: determining that at least one of a voltage across the intermediate component and a current through the intermediate component has reached zero; determining that the at least one voltage and current has reached a threshold level, and determining that a time period has elapsed since performing of (a) began; and (d) upon making a determination required by (c), commanding an input contactor to close.

10. The method of claim 1, wherein the power converter is a current source inverter (CSI), the first component is a first capacitor coupled between the input terminal and an additional node, and the intermediate component is a first inductor.

11. The method of claim 1, wherein the power converter is a voltage source inverter (VSI), and wherein the intermediate component includes a capacitor.

12. The method of clam 1, wherein the rectifier includes a first set of six switching devices and the inverter includes a second set of six switching devices, and the power converter is a motor drive.

13. The method of claim 12, wherein each of the switching devices is at least one of a symmetric gate commutated thyristor (SGCT) and an integrated gate commutated thyristor (IGCT).

14. The method of claim 1, wherein the at least one first component includes first, second and third capacitors, wherein the at least one input port includes first, second and third input ports, and wherein the first, second and third capacitors are respectively coupled between a common node and the first, second and third input ports.

15. The method of claim 14, wherein the first, second and third capacitors are at least one of wye-connected and delta-connected.

16. The method of claim 14, wherein the operating includes both performing of a discharge control operation in which three-component information is transformed into two-component information, and a trapezoidal space vector modulation in which the two-component information is transformed into a plurality of gating signals to be communicated to the rectifier.

17. The method of claim 14, wherein the operating includes:
(a) converting three-component information into polar coordinate information;
(b) generating a firing angle based at least indirectly upon the three-component information;
(c) generating a modulation index based at least indirectly upon the three-component information; and
(d) determining a plurality of gating signals based upon each of the polar coordinate information, the firing angle and the modulation index.

18. The method of claim 17, wherein the plurality of gating signals are determined by combining the firing angle with the polar coordinate information to generate combination information, and performing a trapezoidal space vector modulation based upon the combination information and the modulation index.

19. The method of claim 17, wherein the firing angle is calculated based upon a square of a normalized voltage value associated with at least one voltage of the at least one first component, and wherein the modulation index is calculated based upon the normalized voltage value taken to a fourth power.

20. The method of claim 1, wherein the operating in (b) includes controlling switching devices of the inverter to fire at a firing angle intended to produce maximum torque.

21. The method of claim 1, wherein at least one of the first and second disconnect modes is a free-wheeling mode.

22. A power converter comprising:
a rectifier section;
an inverter section;
at least one first energy storage component coupled to at least one first input port of the rectifier section;
at least one second energy storage component coupled to at least one second input port of the inverter section and to at least one first output port of the rectifier section; and
means for controlling that is coupled to each of the rectifier section and the inverter section,
wherein, upon an occurrence of an input power disruption, the means for controlling causes energy to be transferred from the at least one first energy storage component to the at least one second energy storage component, and then subsequently the means for controlling causes at least some of the energy to be transferred from the at least one second energy storage component to at least one second output port of the inverter, and
wherein the energy is transferred from the at least one first energy storage component to the at least one second energy storage component when the inverter is controlled to enter a first disconnect mode, and wherein the energy is transferred from the at least one second energy storage component to the at least one second output port when the rectifier is controlled to enter a second disconnect mode.

23. The power converter of claim 22, wherein the means for controlling includes a microprocessor, wherein the microprocessor generates a plurality of gating signals to be provided to the rectifier section when the energy is transferred from the at least one first energy storage component to the at least one second energy storage component.

24. The power converter of claim 23, wherein the microprocessor generates the gating signals by performing a trapezoidal space vector modulation.

25. The power converter of claim 24, wherein the microprocessor further calculates a firing angle and a modulation index based upon voltage level information concerning voltages across the at least one first energy storage component.

26. The power converter of claim 22, wherein the at least one first energy storage component includes first, second and third capacitors that are filter capacitors for input power received by way of at least one input terminal of the power converter.

27. The power converter of claim 22, wherein the power converter is at least one of a single-phase power converter, a three-phase power converter, and a multi-phase power converter having a number of phases other than three.

28. The power converter of claim 22, wherein the power converter is a motor drive.

29. The power converter of claim 22, wherein at least one of the rectifier and the inverter has a plurality of switching devices that include at least one of a plurality of symmetric gate commutated thyristors (SGCTs), a plurality of insulated gate bipolar transistors (IGBTs), and a plurality of integrated gate commutated thyristors (IGCTs).

30. A computer-readable medium embodying instructions for a processor to perform a method of discharging three energy storage devices coupled to three input ports of a power converter, the method comprising:
generating first control signals for controlling a rectifier and an inverter,
wherein the first control signals include first inverter control signals that are configured to cause the inverter to operate in a disconnect mode of operation, and
wherein the first control signals also include first rectifier control signals that are configured to cause substantially all stored energy in all of the three energy storage devices to be transferred to at least one intermediate energy storage component coupled to each of the rectifier and the inverter.

31. The computer readable medium of claim 30, wherein the first control signals are generated at least in part by calculating a square of a voltage magnitude based upon three voltage levels of the three energy storage devices, respectively, and by calculating a value that is based upon the voltage magnitude taken to the fourth power.

32. The computer readable medium of claim 30, wherein the method further comprises:
generating second control signals for controlling the rectifier and the inverter, wherein the second control signals include second rectifier control signals that are configured to cause the rectifier to operate in a freewheeling mode of operation, and wherein the second control signals also include second inverter control signals that are configured to cause substantially all stored energy in the at least one intermediate energy storage component to be transferred to at least one output port of the power converter, whereby it is in turn discharged to a load.

33. A method of operating a power converter having a first set of switching devices coupled between at least one input component and at least one intermediate component, and a second set of switching devices coupled between the at least one intermediate component and at least one output port, the method comprising:
   (a) after experiencing an interruption to an input power supplied to the at least one input component of the power converter, operating the power converter in a first manner in which the at least one intermediate component is electrically disconnected from the at least one output port, and in which first energy stored in the at least one input component is provided to the at least one intermediate component;
   (b) subsequently operating the power converter in a second manner in which the at least one input component is electrically disconnected from the at least one intermediate component, and in which at least some of the first energy provided to the at least one intermediate component is transferred to the at least one output port.

34. The method of claim 33, wherein a microprocessor controls the second set of switching devices in (a) so that the at least one intermediate component is electrically disconnected from the at least one output port, and controls the first set of switching devices in (b) so that the at least one input component is electrically disconnected from the at least one intermediate component.

35. The method of claim 34, wherein the microprocessor further calculates a firing angle and a modulation index based upon voltage level information concerning voltages across the at least one input component.

36. The method of claim 33, wherein the at least one input component includes first, second and third capacitors that are filter capacitors for the input power received by way of at least one input terminal of the power converter, and wherein the power converter is at least one of a single-phase power converter, a three-phase power converter, and a multi-phase power converter having a number of phases other than three; and
   wherein the first set of switching devices operates as a rectifier and the second set of switching devices as an inverter when the input power is supplied to the at least one input terminal.

* * * * *